US009032986B2

United States Patent
Lovell et al.

(10) Patent No.: US 9,032,986 B2
(45) Date of Patent: May 19, 2015

(54) VOLUME BOOSTER WITH VARIABLE ASYMMETRY

(75) Inventors: Michel K. Lovell, Marshalltown, IA (US); Kenneth W. Junk, Marshalltown, IA (US); Ryan J. Jwanouskos, White Bear Lake, MN (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 505 days.

(21) Appl. No.: 13/209,091

(22) Filed: Aug. 12, 2011

(65) Prior Publication Data

US 2012/0061606 A1    Mar. 15, 2012

Related U.S. Application Data

(60) Provisional application No. 61/383,050, filed on Sep. 15, 2010.

(51) Int. Cl.
| *F16K 11/04* | (2006.01) |
| *F15B 13/04* | (2006.01) |
| *F15B 13/043* | (2006.01) |

(52) U.S. Cl.
  CPC .............. *F16K 11/04* (2013.01); *F15B 13/0405* (2013.01); *F15B 13/0433* (2013.01)

(58) Field of Classification Search
  CPC ................................ F16K 11/04; F16K 1/443
  USPC ................... 137/82–86, 269, 625.66; 91/463; 138/40, 46
  See application file for complete search history.

(56) References Cited

U.S. PATENT DOCUMENTS

| 2,007,036 | A | * | 7/1935 | Cornell, Jr. ..................... 138/44 |
| 3,561,468 | A | * | 2/1971 | Sugden, Jr. .................. 137/269 |
| 3,692,054 | A | * | 9/1972 | Buls et al. ....................... 137/84 |
| 3,868,973 | A | * | 3/1975 | Bierman et al. ................ 138/46 |
| 4,109,683 | A | | 8/1978 | Strache |
| 4,183,375 | A | | 1/1980 | Vick |

(Continued)

FOREIGN PATENT DOCUMENTS

| CN | 1942675 A | 4/2007 |
| DE | 26 41 761 A1 | 9/1977 |

(Continued)

OTHER PUBLICATIONS

Instruction Manual, Form 5122, Aug. 2003, Type 2625 and 2625NS Volume Boosters.

(Continued)

*Primary Examiner* — Eric Keasel
(74) *Attorney, Agent, or Firm* — Marshall, Gerstein & Borun LLP (57) ABSTRACT

A volume booster for a fluid flow control device comprises a supply path for supplying a fluid boost to facilitate actuation of an actuator in a first direction, and an exhaust path for enabling controlled exhaust to facilitate actuation of the actuator in a second direction. The supply path defines a supply resistance that is set by the geometry of a supply trim component. The exhaust path includes an exhaust resistance that is set by the geometry of an exhaust trim component. The supply and exhaust trim components are independently removable and replaceable with replacement components to customize the exhaust and supply resistances, and therefore, the exhaust and supply capacities for specific applications.

38 Claims, 4 Drawing Sheets

(56) References Cited

U.S. PATENT DOCUMENTS

| | | | |
|---|---|---|---|
| 4,552,335 A * | 11/1985 | Alexander et al. | 251/315.05 |
| 4,813,339 A | 3/1989 | Uno et al. | |
| 4,898,200 A * | 2/1990 | Odajima et al. | 137/85 |
| 5,370,152 A * | 12/1994 | Carey et al. | 137/85 |
| 5,386,967 A * | 2/1995 | Enniss et al. | 251/315.04 |
| 5,901,749 A | 5/1999 | Watson | |
| 6,003,428 A | 12/1999 | Mundie et al. | |
| 6,910,673 B2 * | 6/2005 | Green et al. | 251/118 |
| 6,981,691 B2 * | 1/2006 | Caprera | 251/298 |
| 7,080,822 B2 * | 7/2006 | Tulaskar | 251/315.01 |
| 7,093,819 B1 * | 8/2006 | Hall et al. | 251/214 |
| 7,458,310 B2 * | 12/2008 | Junk | 91/463 |

FOREIGN PATENT DOCUMENTS

| | | |
|---|---|---|
| DE | 31 40 318 A1 | 4/1983 |
| EP | 0 869 104 A1 | 10/1998 |
| GB | 153392 A | 11/1920 |
| GB | 2 016 168 A | 9/1979 |
| GB | 2 318 406 A | 4/1998 |
| WO | WO-95/12082 A1 | 5/1995 |
| WO | WO-2005/106256 A1 | 11/2005 |

OTHER PUBLICATIONS

Jack L. Johnson, P.E. "Matching valve and cylinder asymmetry," Hydraulics and Pneumatics, Sep. 2003.
Jack L. Johnson, P.E., "The final word on non-symmetrical valves," Hydraulics and Pneumatics, Oct. 2003.
Rudolph Muijtjens, "Praktisches Positionieren mit pneumatischen Linearantrieben," Olhydraulik and Pneumatik, (1998) No. 7., Mainz, DE.
International Search Report and the Written Opinion for International Application No. PCT/US2005/012646, dated Aug. 4, 2005.
International Preliminary Report on Patentability for Application No. PCT/US2011/051417, dated Mar. 19, 2013.
International Preliminary Report on Patentability for Application No. PCT/US2011/051422, dated Mar. 19, 2013.
International Search Report and Written Opinion for Application No. PCT/US2011/051417, dated Dec. 28, 2011.
International Search Report for PCT/US2011/051422, mailed Dec. 28, 2011.
Written Opinion for PCT/US2011/051422, mailed Dec. 28, 2012.
English Translation of the First Office Action from Chinese Patent Application No. 201110274730.7 dated Dec. 22, 2014.
First Office Action for Chinese Application No. 201110274799.X, dated Dec. 22, 2014.

* cited by examiner

VOLUME BOOSTER WITH VARIABLE ASYMMETRY

CROSS-REFERENCE TO RELATED APPLICATIONS

The priority benefit of U.S. Provisional Patent Application No. 61/383,050, filed Sep. 15, 2010, is hereby claimed and the entire contents thereof are incorporated herein by reference.

FIELD OF THE DISCLOSURE present disclosure relates to fluid flow control systems, and more particularly, to volume flow boosters for enhancing control valve performance in fluid flow control systems.

BACKGROUND

Systems for controlling the flow of fluids, such as compressed air, natural gas, oil, propane, or the like, are generally known in the art. These systems often include at least one control valve for controlling various flow parameters of the fluid. Typical control valves include a control element such as a valve plug, for example, movably disposed within the flow path for controlling the flow of the fluid. The position of such a control element can be controlled by a positioner via a pneumatic actuator such as a piston actuator or a diaphragm-based actuator, as is known in the art. Conventional positioners deliver pneumatic signals to the actuator to stroke the control element of the control valve between an open and closed position, for example. The speed at which a standard positioner can stroke the control valve, however, partly depends on the sizes of the actuator and the control valve. For example, larger actuators/control valves typically take longer to be stroked.

Therefore, such systems additionally employ one or more volume boosters located between the positioner and the actuator. The volume boosters are used to amplify the volume of the pneumatic signal sent from the positioner, thereby increasing the speed at which the actuator strokes the control element of the control valve. Conventional volume boosters are offered in varying capacities such that a specific volume booster can be installed into a control system to suit a specific application. If the application changes, the volume booster can be switched out for a different volume booster having a different capacity.

SUMMARY

DETAILED DESCRIPTION OF THE PREFERRED EMBODIMENTS

The examples, i.e., embodiments, described herein are not intended to be exhaustive or to limit the scope of the invention to the precise form or forms disclosed. Rather, the following description has been chosen to provide examples of the one or more preferred embodiments to those having ordinary skill in the art.

Figure 1:
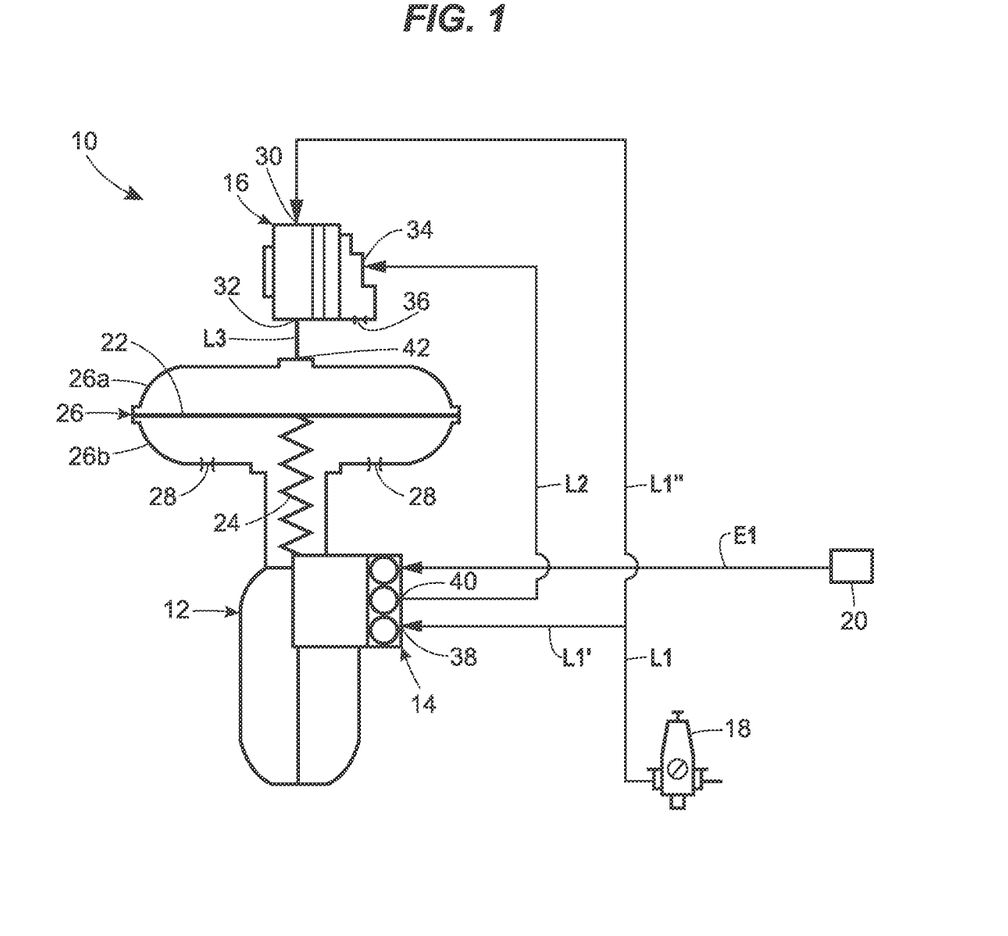
FIG. 1 is a schematic representation of a single-acting spring and diaphragm actuator assembly including a volume booster constructed in accordance with the principles of the present disclosure.

FIG. 1 provides a schematic representation of a single-acting spring and diaphragm actuator assembly 10 constructed in accordance with the principles of the present disclosure. Specifically, the actuator assembly 10 comprises an actuator 12, a positioner 14, and a volume booster 16. In the disclosed embodiment, the actuator assembly 10 is also illustrated as being fluidly coupled to a regulator 18. The actuator 12 is adapted to be operably connected to a control valve (not shown) equipped with a movable control element for controlling the flow of a fluid through a system such as a fluid distribution or other fluid management system, for example.

Still referring to FIG. 1, the volume booster 16 includes an inlet port 30, a common port 32, a control port 34, and a discharge port 36. The positioner 14 includes an inlet 38 and an outlet 40. The actuator 12 includes a booster communication port 42. The actuator 12, the positioner 14, the volume booster 16, and the regulator 18 communicate with each other via a plurality of fluid lines. Specifically, the regulator 18 is in fluid communication with the positioner 14 and the volume booster 16 via a supply line L1, which is split into a first supply line L1' and a second supply line L1". The outlet 40 of the positioner 14 is in fluid communication with the control port 34 of the volume booster 16 via an output signal line L2. The common port 32 of the volume booster 16 is in fluid communication with the booster communication port 42 of the actuator 12 via a control line L3.

As will be described in more detail, the first supply line L1' is adapted to deliver a supply pressure to the inlet 38 of the positioner 14 and the second supply line L1" is adapted to deliver a supply pressure to the inlet port 30 of the volume booster 16. The supply pressure can be provided to the supply line L1 via the regulator 18 from a pressure source such as a compressor, for example. Additionally, the positioner 14 is adapted to deliver a pneumatic control signal to the volume booster 16 via the output signal line L2 for controlling the operation of the actuator 12.

For example, based on an electrical signal received from a controller 20 via an electrical connection E1, the positioner 14 transmits a pneumatic signal to the control port 34 of the volume booster 16 via the output signal line L2. The pneumatic signal passes through the volume booster 16 to instruct the actuator 12 to actuate the control valve (not shown). Typically, the positioner 14 is adapted to generate a pneumatic signal of a relatively modest pressure. Therefore, depending on the size of the actuator 12 and/or the desired speed at which the actuator 12 is to stroke the control valve, the volume booster 16 can operate to supplement the pneumatic signal with additional fluid sourced from the supply line L1, as will be described.

In the embodiment depicted in FIG. 1, the actuator 12 includes a fail-up actuator comprising a diaphragm 22 and a spring 24 contained within a diaphragm casing 26. The diaphragm 22 divides the casing 26 into a top cavity 26a and a bottom cavity 26b. The spring 24 is disposed in the bottom cavity 26b of the casing 26 and biases the diaphragm 22 upward. Therefore, when the positioner 14 sends a pneumatic signal to the volume booster 16 via the output signal line L2, pneumatic pressure is introduced into the top cavity 26a of the actuator 12, thereby moving the diaphragm 22 downward. This downward movement is then transferred into a corresponding movement of the control element of the associated control valve (not shown), as is understood within the art.

Preferably, the casing 26 includes one or more vents 28 such that fluid contained within the bottom cavity 26b vents out of the casing 26 when the diaphragm 22 moves downward. Such venting facilitates the movement of the diaphragm 22 in the downward direction. To stroke the actuator 12 upward, the positioner 14 stops sending the pneumatic signal to the volume booster 16 such that the spring 24 moves the diaphragm 22 upward. As the diaphragm 22 moves upward, the pressure built up in the upper cavity 26a of the casing 26 exhausts to the atmosphere via the control line L3 and the discharge port 36 of the volume booster 16. This exhausting to the atmosphere facilitates the movement of the diaphragm 22 in the upward direction.

Figure 2:
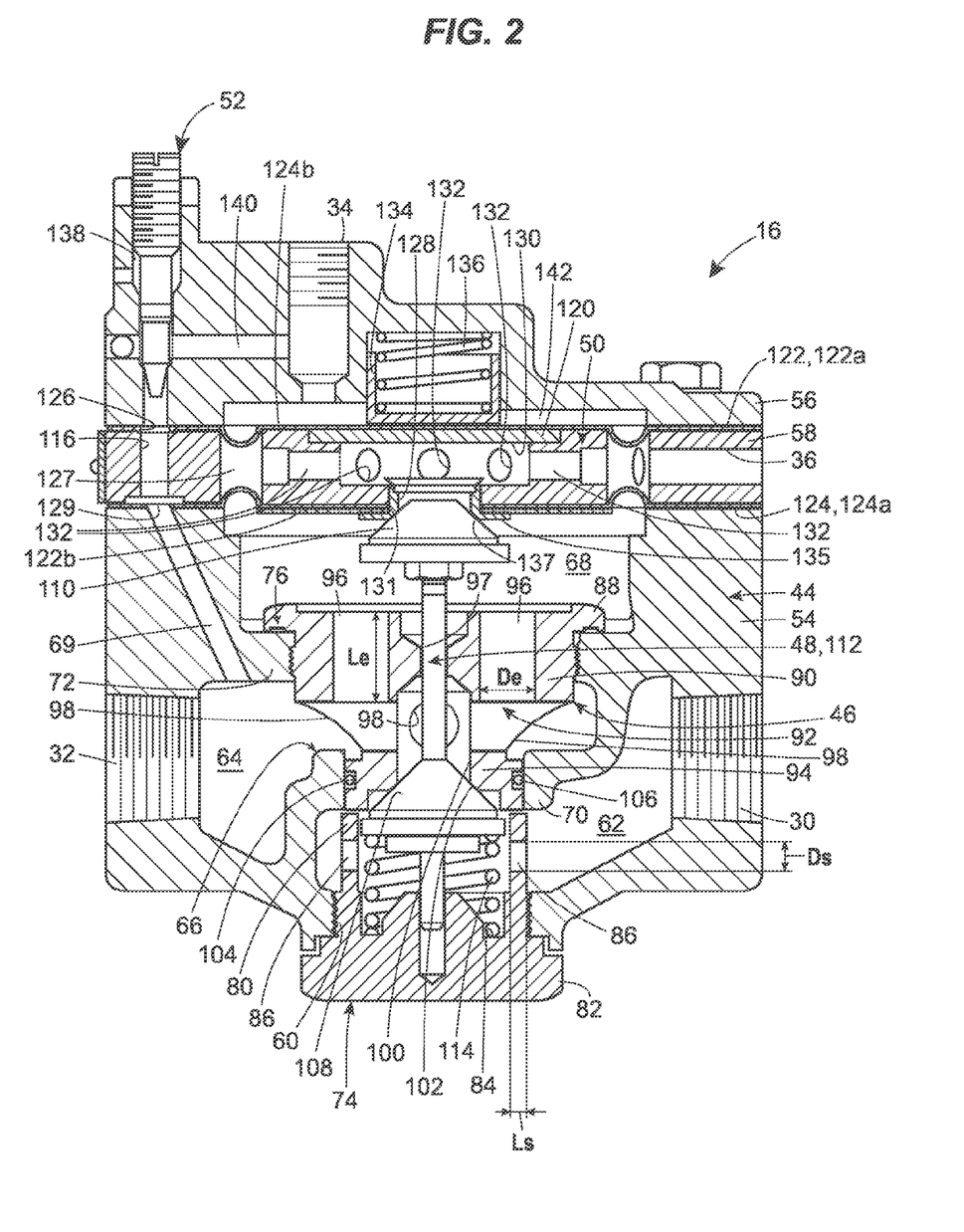
FIG. 2 is a side cross-sectional view of one embodiment of a volume booster constructed in accordance with the principles of the present disclosure.

With reference now to FIG. 2, one embodiment of the volume booster 16 depicted in FIG. 1 will be described. In general, the volume booster 16 includes a body 44, a trim assembly 46, a control element 48, a diaphragm assembly 50, and a bypass adjustment device 52.

The body 44 generally includes a trunk portion 54, a cap portion 56, and a bushing portion 58. The trunk portion 54 of the body 44 defines the inlet port 30 and the common port 32. Additionally, the trunk portion 54 defines a supply trim opening 60, an inlet chamber 62, a common chamber 64, a throat region 66, an exhaust chamber 68, and a bypass passage 69. The throat region 66 is disposed between the inlet chamber 62 and the common chamber 64 and generally defines a cylindrical cavity including a lower web 70 and an upper web 72. The lower and upper webs 70, 72 each include threaded cylindrical openings receiving portions of the trim assembly 46, as will be described. Similarly, the supply trim opening 60 includes a threaded cylindrical opening receiving a portion of the trim assembly 46.

The trim assembly 46 includes a supply trim component 74 and an exhaust trim component 76. The supply trim component 74 includes a cylindrical bushing removably threaded into the supply trim opening 60 of the trunk portion 54 of the body 44 of the volume booster 16. More specifically, the supply trim component 74 includes a skirt portion 80, a hexagonal nut portion 82, and a spring seat 84.

The skirt portion 80 includes a generally hollow cylindrical member extending from the hexagonal nut portion 82 into the supply chamber 62 of the trunk portion 54 of the body 44. The skirt portion 80 defines a plurality of passages 86 extending radially therethrough. In the depicted embodiment, the passages 86 include cylindrical bores. Thus, the passages 86 extend along an axis that is generally perpendicular to an axis of the skirt portion 80. So configured, the skirt portion 80 of the supply trim component 74 restricts the flow of fluid through the body 44 from the supply chamber 62 to the throat region 66.

Still referring to FIG. 2, the exhaust trim component 76 includes a cylindrical bushing removably threaded into the cylindrical opening of the upper web 72 of the throat region 66 of the body 44. More specifically, the exhaust trim component 76 includes a hexagonal nut portion 88, a restrictor portion 90, a skirt portion 92, and a seating portion 94.

The hexagonal nut portion 88 of the exhaust trim component 76 is disposed within the exhaust chamber 68 of the body 44 and abutted against the upper web 72. The restrictor portion 90 includes a generally solid cylindrical member disposed within the cylindrical opening of the upper web 72 and defines a plurality of exhaust passages 96 and a control opening 97. In the depicted embodiment, the passages 96 in the restrictor portion 90 include cylindrical bores extending axially through the exhaust trim component 76. The skirt portion 92 extends from the restrictor portion 90 into the throat region 66 and defines a plurality of windows 98. So configured, the plurality of passages 96 in the restrictor portion 90 provides constant fluid communication between the common chamber 64 and the exhaust chamber 68, via the windows 98 in the skirt portion 92.

The seating portion 94 of the exhaust trim component 76 includes a generally cylindrical member disposed within a cylindrical opening of the lower web 70 of the body 44. The seating portion 94 defines a central bore 100 and a valve seat 102. The central bore 100 is defined herein as a "supply port" of the volume booster 16. In the disclosed embodiment, the seating portion 94 also includes an external annular recess 104 receiving a seal 106 such as an o-ring. The seal 106 provides a fluid tight seal between the seating portion 94 of the exhaust trim component 76 and the lower web 70.

As illustrated in FIG. 2, the control element 48 of the disclosed embodiment of the volume booster 16 includes a dumbbell shaped control element comprising a supply plug 108, an exhaust plug 110, and a stem 112. The stem 112 extends between and connects the supply plug 108 to the exhaust plug 110, and is slidably disposed in the control opening 97 of the restrictor portion 90 of the exhaust trim component 76. So configured, the exhaust plug 110 is disposed within the exhaust chamber 68 of the body 44, and the supply plug 108 is disposed within the supply chamber 62 of the body 44. More specifically, the supply plug 108 is disposed inside of the skirt portion 80 of the supply trim component 74 and is biased away from the supply trim component 74 by a spring 114. The spring 114 is seated against the spring seat 84 of the supply trim component 74. The spring 114 biases the supply plug 108 of the control element 48 into engagement with the valve seat 102 of the seating portion 94 of the exhaust trim component 76, thereby closing the "supply port" 100. In the disclosed embodiment, each of the supply and exhaust plugs 108, 110 includes a tapered cylindrical body defining a frustoconical seating surface. Other shapes of course could be implemented to satisfy the intended functions.

As mentioned above, the bushing portion 58 of the body 44 of the volume booster 16 is sandwiched between the cap portion 56 and the trunk portion 54. Generally, the bushing portion 58 includes an annular ring defining a radial through-bore, which comprises the discharge port 36 of the volume booster 16. Additionally, the bushing portion 58 defines an axial through-bore 116 in alignment with the bypass passage 69 of the trunk portion 54 of the body 44. The discharge port 36 provides fluid communication between the exhaust chamber 68 of the trunk portion 54 of the body 44 and the atmosphere, via the diaphragm assembly 50, as will be described.

The diaphragm assembly 50 comprises a floating manifold 120 sandwiched between first and second diaphragms 122, 124. The first diaphragm 122 includes a flexible diaphragm made from a known diaphragm material and includes a peripheral portion 122a and a central portion 122b. The peripheral portion 122a is compressed between the cap portion 56 and the bushing portion 58 of the body 44 of the volume booster 16. The peripheral portion 122a additionally defines an opening 126 in alignment with the axial through-bore 116 of the bushing portion 58. The second diaphragm 124 similarly includes a flexible diaphragm made from a known diaphragm material and includes a peripheral portion 124a and a central portion 124b. The peripheral portion 124a of the second diaphragm 124 is compressed between the bushing portion 58 and the trunk portion 54 of the body 44. The peripheral portion 124a additionally defines an opening 129 in alignment with the axial through-bore 116 of the bushing portion 58. The central portion 124b further defines a central opening 131. The manifold 120 is disposed between the central portions 122b, 124b of the first and second diaphragms 122, 124 such that an annular passage 127 is defined between the manifold 120 and the bushing portion 58 of the body 44.

The manifold 120 comprises a disc-shaped member movably disposed inside of the bushing portion 58 of body 44. The manifold 120 defines an axial opening 128, an internal cavity 130, and a plurality of radial passages 132. The axial opening 128 is aligned with the central opening 131 in the second diaphragm 124 and is defined herein as an "exhaust port" of the volume booster 16. The axial opening 128 is equipped with a seating member 135 defining a valve seat 137. The axial opening 128 provides for fluid communication between the exhaust chamber 68 of the trunk portion 54 of the body 44 and the internal cavity 130 of the manifold 120. The radial passages 132 provide for fluid communication between the internal cavity 130 of the manifold 120 and the annular passage 127 disposed between the manifold 120 and the bushing portion 158 of the body 44.

As is also depicted in FIG. 2, the present embodiment of the volume booster 16 includes a seating cup 134 and a spring 136 disposed between the diaphragm assembly 50 and the cap portion 56 of the body 44. The seating cup 134 receives the spring 136 and the spring 136 biases the diaphragm assembly 50 away from the cap portion 56 such that the valve seat 137 of the seating member 135 disposed in the axial opening 128 of the manifold 120 engages the exhaust plug 110 of the control element 46. This engagement closes the "exhaust port" 128.

Finally, the cap portion 56 of the body 44 of the volume booster 16 includes the control port 34 and a threaded bore 138 connected by a fluid passage 140. Additionally, the cap portion 56 defines a signal chamber 142 disposed above the diaphragm assembly 50 and in fluid communication with the control port 34. The threaded bore 138 accommodates the bypass control device 52, which in one embodiment can include an adjustment screw. The bypass control device 52 can therefore be adjusted to adjust the volume of fluid that is allowed to travel from the control port 34 to the common chamber 64, as will be described.

As described above, to actuate the actuator 12 in the downward direction, the positioner 14 sends a pneumatic signal to the volume booster 16. Depending on the magnitude of the pressure of the pneumatic signal, the signal either actuates the actuator 12 by itself, or the signal activates the volume booster 16 and the signal is supplemented by fluid pressure supplied from the regulator 18.

For example, if the pressurized signal is not high enough to activate the volume booster 16, as will be described, the fluid travels from the control port 34, through the fluid passage 140 in the cap portion 56, beyond the bypass adjustment device 52, and to the common chamber 64 of the trunk portion 54 of the body 44, via the axial through-bore 116 in the bushing portion 58, and the bypass passage 69 in the trunk portion 54 of the body 44. From there, the fluid exits the body 44, via the common port 32, and enters the booster communication port 42 of the actuator 12 to move the diaphragm 22 in the downward direction.

While the pressurized signal actuates the actuator 12, it is also provided to the signal chamber 142 defined by the cap portion 56 of the body 44. Additionally, a steady supply pressure is constantly provided to the supply chamber 62 of the trunk portion 54 of the body 44 from the regulator 18 (shown in FIG. 1).

For the sake of description, a pressure differential across the volume booster 16 is defined as a pressure differential occurring across the diaphragm assembly 50, i.e., between the signal chamber 142 and the exhaust chamber 68. Because the exhaust chamber 68 is in continuous fluid communication with the output chamber 64 of the trunk portion 54 of the body 44 (via the exhaust passages 96 in the exhaust trim component 76), it can also be said that a pressure differential across the volume booster 16 is defined as a pressure differential occurring between the signal chamber 142 and the output chamber 64.

If the pressure differential across the volume booster 16 is insubstantial, the supply and exhaust plugs 108, 110 of the control element 48 remain in the closed positions, as depicted in FIG. 2, whereby each sealingly engages the valve seats 102, 137 of the respective supply and exhaust ports 100, 128. So disposed, the diaphragm assembly 50 stays in a static unloaded position. This position is also assisted by the spring 114 biasing the supply plug 108 into engagement with the supply port 100, and the spring 136 biasing the diaphragm assembly 50 into engagement with the exhaust plug 110.

In contrast, a substantial pressure differential across the volume booster 16 is one that is great enough to affect the diaphragm assembly 50, whether up or down, to move the control element 48, relative to the orientation of the volume booster 16 depicted in FIG. 2.

During operation, a positive differential condition is achieved when pressure is substantially greater in the signal chamber 142 than in the exhaust chamber 68 such as when the positioner 14 delivers a high pressure signal to the control port 34. This can occur when the controller 20 instructs the positioner 14 to stroke the actuator 12 in the downward direction, for example. The high pressure signal forces the floating diaphragm assembly 50 downward, which moves the control element 48 downward, thereby keeping the exhaust plug 110 closed against the exhaust port 128 and moving the supply plug 108 away from the supply port 100. Thus, the volume booster 16 opens a "supply path," which provides fluid flow from the regulator 18 to the actuator 12 via the volume booster 16. Specifically, fluid from the regulator 18 flows into the supply chamber 62, then through the supply port 100 and the common chamber 64 to the actuator 12, via the common port 32. Again, because the common chamber 64 is also in constant fluid communication with the exhaust chamber 68 via the exhaust passages 96 in the exhaust trim component 76, the pressure in the common camber 64 is also registered on the second diaphragm 124 of the diaphragm assembly 50.

When the controller 20 instructs the positioner 14 to stroke the actuator 12 back upward, the positioner 14 may reduce the pressure of the pneumatic signal transmitted to the volume booster 16. This causes the pressure in the signal chamber 142 to reduce and equalize with the pressure in the common chamber 64. The diaphragm assembly 50 begins to rise back upward, and the spring 114 biases the control element 48 back upward such that the supply plug 108 reseals against the valve seat 102 of the supply port 100, thereby closing the "supply path."

Once the "supply path" is closed, the control element 48 cannot move further upward, but back pressure from the common chamber 64 moves the diaphragm assembly 50 further upward against the force of the spring 136. This moves the diaphragm assembly 50 away from the exhaust plug 110 of the control element 48 and opens the exhaust port 128. With the exhaust port 128 open, the volume booster 16 defines an "exhaust path" between the common chamber 64 and the discharge port 36. That is, pressurized fluid in the common chamber 64 travels to the exhaust chamber 68 via the passages 96 in the exhaust trim component 76, then to the central cavity 130 of the manifold 120 via the central opening 128, through the radial passages 132 in the manifold 120, and out of the exhaust port 36 to the atmosphere.

As mentioned above, the bypass adjustment device 52 can be adjusted so that different pressures from the positioner 14 will activate the volume booster 16, as just described. For example, if the bypass adjustment device 52 nearly completely blocks communication between the control port 34 and the bypass passage 69 to the common chamber 64, a relatively small pressure from the positioner 14 can activate the volume booster 16. This is because nearly all of the pressure transmitted by the positioner 14 will enter the signal chamber 142 and bear on the first diaphragm 122, thereby forcing the diaphragm assembly 50 and the control element 48 downward to open the "supply path" by opening the supply port 100. In contrast, if the bypass adjustment device 52 allows a large volume of fluid to flow through to the bypass passage 69 and onto the control chamber 64, less fluid pressure will bear on the first diaphragm 122 of the diaphragm assembly 50, and the volume booster 16 will only be activated under a comparatively higher pressure from the positioner 14.

Volume boosters of this type can generally be characterized as having an exhaust capacity and a supply capacity. The exhaust capacity can be described as the maximum volume of fluid capable of traveling along the "exhaust path," i.e., from the common chamber 64 to the discharge port 36 when the exhaust port 128 is open. The exhaust capacity of the volume booster 16 depicted in FIG. 2 is, at least partly, dependent on the geometry and dimensions of the "exhaust path" such as the exhaust passages 96 in the exhaust trim component 76. That is, the exhaust trim component 76 operates as a restriction to the flow of fluid along the "exhaust path."

For example, the supply passages 86 define a fluid flow resistance for the supply trim component 74, which directly affects the capacity of the "supply path," i.e., the supply capacity. The fluid flow resistance is a function of the geometry of the skirt portion 80, including a diameter $D_s$, a longitudinal dimension $L_s$, and the number of passages 86. The longitudinal dimension $L_s$ is equal to, and therefore, dependent on a radial dimension of the skirt portion 80, while the diameter $D_s$ can be arbitrarily selected or carefully calculated and selected based upon desired flow characteristics of the volume booster 16.

The supply capacity can be described as the maximum volume of fluid capable of traveling along the "supply path," i.e., from the supply chamber 62 to the common chamber 64 when the supply port 100 is open. The supply capacity of the volume booster 16 depicted in FIG. 2 is, at least partly, dependent on the geometry and dimensions of the supply passages 86 in the supply trim component 74. That is, the supply trim component 74 operates as a restriction to the flow of fluid along the "supply path."

For example, the exhaust passages 96 define a fluid flow resistance for the exhaust trim component 79, which directly effects the capacity of the "exhaust path," i.e., the exhaust capacity. The fluid flow resistance is a function of the geometry of the exhaust trim component 76, including a diameter $D_e$, a longitudinal dimension $L_e$, and the number of exhaust passages 96. The longitudinal dimension $L_e$ is equal to, and therefore, dependent on an axial dimension of the exhaust trim component 76, while the diameter $D_e$ can be arbitrarily selected or carefully calculated and selected based upon desired flow characteristics of the volume booster 16.

Optimum operational conditions allow for the actuator 12 depicted in FIG. 1 to be actuated in either direction in generally the same amount of time, which is referred to as symmetric performance. To enable symmetric performance, the supply capacity and the exhaust capacity of the volume booster 16 depicted in FIG. 2 should be substantially identical. So configured, fluid can flow along the "supply path" in generally the same capacity as it can flow along the "exhaust path." Depending on a variety of system factors, the geometry of the volume booster 16 can affect whether or not symmetric performance is achievable.

Therefore, the presently disclosed volume booster 16 includes supply and exhaust trim components 74, 76 that are removably secured within the body 44. This advantageously enables the supply and exhaust capacities to be tailored for certain operational conditions.

For example, the hexagonal nut portion 82 of the supply trim component 74 enables a technician to grasp the supply trim component 74 with a wrench, for example, to install the supply trim component 74 into the body 44, as well as remove the supply trim component 74 from the body 44 such that it can be replaced with an alternative supply trim component. Replacement supply trim components can have differently configured skirt portions, thereby defining different fluid flow resistances and supply capacities. For example, replacement supply trim components can include skirt portions defining passages with varying diameters. Passages with smaller diameters, will generate greater fluid flow resistance than passages with larger diameters. Additionally, replacement supply trim components can include skirt portions of varying thickness, thereby defining passages of varying longitudinal dimensions. Passages with smaller longitudinal dimensions will generate less fluid flow resistance than passages with greater longitudinal dimensions. Furthermore, replacement supply trim components can include skirt portions defining passages that are shaped and configured other than to include cylindrical bores to define different fluid flow resistances. Further still, replacement supply trim 74 components can have a different number of passages 86 to alter the flow resistance.

Similar to the supply trim component 74, the exhaust trim component 76 can be removed from the body 44 and replaced with an alternative exhaust trim component having a different exhaust capacity. The exhaust trim component 76 can be removed from the body 44 by first removing the cap portion 56, the bushing portion 58, and the diaphragm assembly 50. Then, a tool such as a wrench, for example, can be used to grasp the hexagonal nut portion 88 of the exhaust trim component 76 to remove the exhaust trim component 76 from the body 44. Replacement exhaust trim components 76 can have exhaust passages 96 of different diameters, different longitudinal dimensions, more or fewer passages 96, or passages 86 having distinct shapes and configurations for generating generally any desired exhaust capacity.

Figure 3:
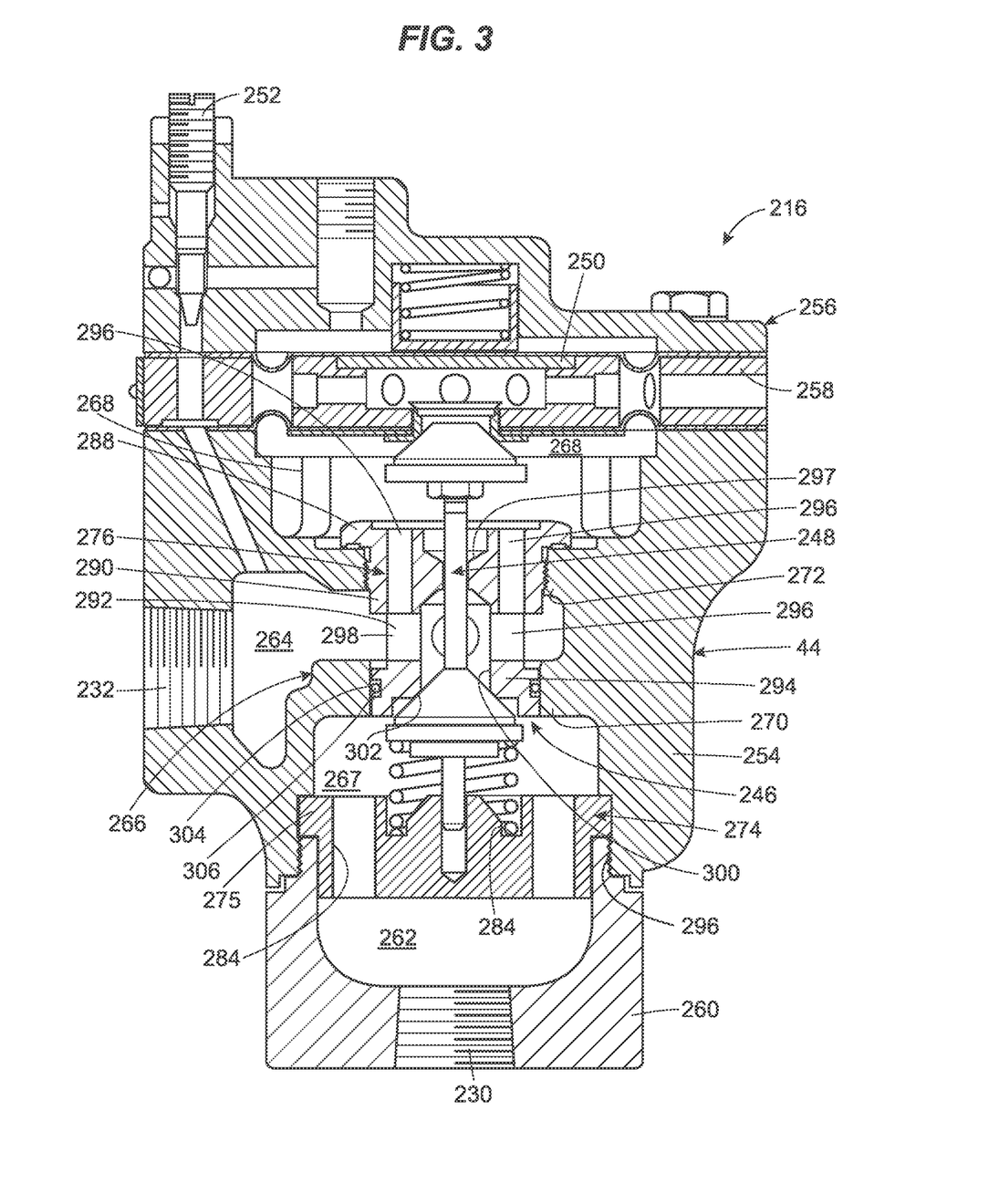
FIG. 3 is a side cross-sectional view of another embodiment of a volume booster constructed in accordance with the principles of the present disclosure.

FIG. 3 depicts an alternative volume booster 216 constructed in accordance with the principles of the present disclosure. For example, the volume booster 16 depicted in FIG. 1 comprises a globe-style body 44, while the volume booster 216 depicted in FIG. 3 comprises an angled-style body 244. The angled-style body 244 provides different packaging that can minimize excess external piping in certain system applications. The body 244 nevertheless comprises a trunk portion 254, a cap portion 256, and a bushing portion 258. The body 244 further includes an inlet coupler 260. The cap portion 256 and bushing portion 258 are identical to the cap portion 56 and the bushing portion 58 described above with reference to the volume booster 16 depicted in FIG. 2, and therefore, the details thereof will not be repeated.

The trunk portion 254 of the body 244 includes a common port 232, a common chamber 264, a throat portion 266, and an exhaust chamber 268. The throat portion 266 defines a lower web 270, an upper web 272, a throat chamber 267, and an inlet opening 269. The inlet coupler 260 of the body 244 defines an inlet port 230 and an inlet chamber 262. The inlet coupler 260 is threadably attached to the throat portion 266 of the trunk portion 254 of the body 244 such that the inlet port 230 is disposed approximately 90° relative to the common port 232.

Still referring to FIG. 3, the volume booster 216 includes a trim assembly 246, a control element 248, a diaphragm assembly 250, and a bypass control device 252. Generally, the control element 248, the diaphragm assembly 250, and bypass control device 252 are identical to the corresponding components described above with reference to the volume booster 16 depicted in FIG. 2, and therefore, the details thereof will not be repeated.

The trim assembly 246 of the volume booster 216 includes a supply trim component 274 and an exhaust trim component 276. The supply trim component 274 comprises a bushing with a radial flange 275 clamped between the inlet component 260 of the body 244 and the inlet opening 269 of the throat portion 266 of the body 244. The supply trim component 274 defines a plurality of supply passages 286 and a spring seat 284. The spring seat 284 supports a spring 214 that biases the control element 248 in the upward direction, relative to the orientation of the volume booster 216 depicted in FIG. 3. The supply passages 286 extend through the supply trim component 274 to provide for fluid communication between the inlet port 230 and the throat chamber 267.

The exhaust trim component 276 includes a cylindrical bushing removably threaded into the cylindrical opening of the upper web 272 of the throat region 266 of the body 244. More specifically, the exhaust trim component 76 includes a hexagonal nut portion 288, a restrictor portion 290, a skirt portion 292, and a seating portion 294.

The hexagonal nut portion 288 of the exhaust trim component 276 is abutted against the upper web 272 of the throat portion 266 such that restrictor portion 290 is disposed within the cylindrical opening of the upper web 272. The restrictor portion 290 is a generally cylindrical member defining a plurality of exhaust passages 296 and a control opening 297. In the depicted embodiment, the exhaust passages 296 in the restrictor portion 290 include cylindrical bores extending axially through the exhaust trim component 276. The skirt portion 292 extends from the restrictor portion 290 into the throat region 266 and defines a plurality of windows 298. So configured, the plurality of exhaust passages 296 in the restrictor portion 290 provide constant fluid communication between the common chamber 264 and the exhaust chamber 268, via the windows 298 in the skirt portion 292.

The seating portion 294 of the exhaust trim component 276 includes a generally cylindrical member disposed within a cylindrical opening of the lower web 270 of the body 244. The seating portion 294 defines a central bore 300 and a valve seat 302. The central bore 300 is defined herein as a "supply port" of the volume booster 216. In the disclosed embodiment, the seating portion 294 also includes an external annular recess 404 receiving a seal 306 such as an o-ring. The seal 306 provides a fluid tight seal between the seating portion 294 of the exhaust trim component 276 and the lower web 270 of the body 244.

During operation, the volume booster 216 described with reference to FIG. 3 functions in a manner that is identical to the volume booster 16 described above with reference to FIG. 2. Therefore, the specific details will not be repeated.

Additionally, similar to the volume booster 16 described above, the supply and exhaust trim components 274, 276 of the volume booster 216 depicted in FIG. 3 can be removed and replaced with replacement supply and exhaust trim components to change the exhaust and supply capacities of the volume booster 216 to meet desired capacities for specific applications. To replace the supply trim component 274, the inlet component 260 of the body 244 is threaded out of attachment with the inlet opening 269 of the trunk portion 254 of the body 244. The supply trim component 274 can then be removed and replaced with a different supply trim component 274 having a different set of supply passages 284 defining a different fluid flow restriction and capacity. Then, the inlet component 260 can be re-threaded to the inlet opening 269 to secure the supply trim component 274 in place. To replace the exhaust trim component 276, the cap portion 256 and bushing portion 258 of the body 244, as well as the diaphragm assembly 250, must first be removed from the trunk portion 254 of the body 244. Then, a technician can grasp the hexagonal nut portion 288 of the exhaust trim component 276 with a wrench or other tool and remove the exhaust trim component 276. A replacement exhaust trim component 276, having a different set of passages defining a different exhaust fluid flow restriction and capacity, can be dropped into the trunk portion 254 of the body 244, and threaded into the opening in the upper web 272.

Accordingly, it should be appreciated that the volume boosters 16, 216 described herein advantageously enable the supply and/or exhaust trim components to be removed and replaced with alternative trim components to change the exhaust and supply capacities of the volume boosters 16, 216 to meet the needs of various applications. One advantage of the arrangement of the volume booster 16 described above with reference to FIG. 2 is that it is more cost effective to service, for example, because once the body 44 is piped into the actuator assembly 10, the supply and/or exhaust trim components 74, 76 can be replaced with the same or alternative components without having to decouple the entire volume booster 16 from the system. Similarly, when using the volume booster 216 depicted in FIG. 3, only the inlet coupler 260 would have to be decoupled from the supply line to replace the supply trim component 274.

Figure 4:
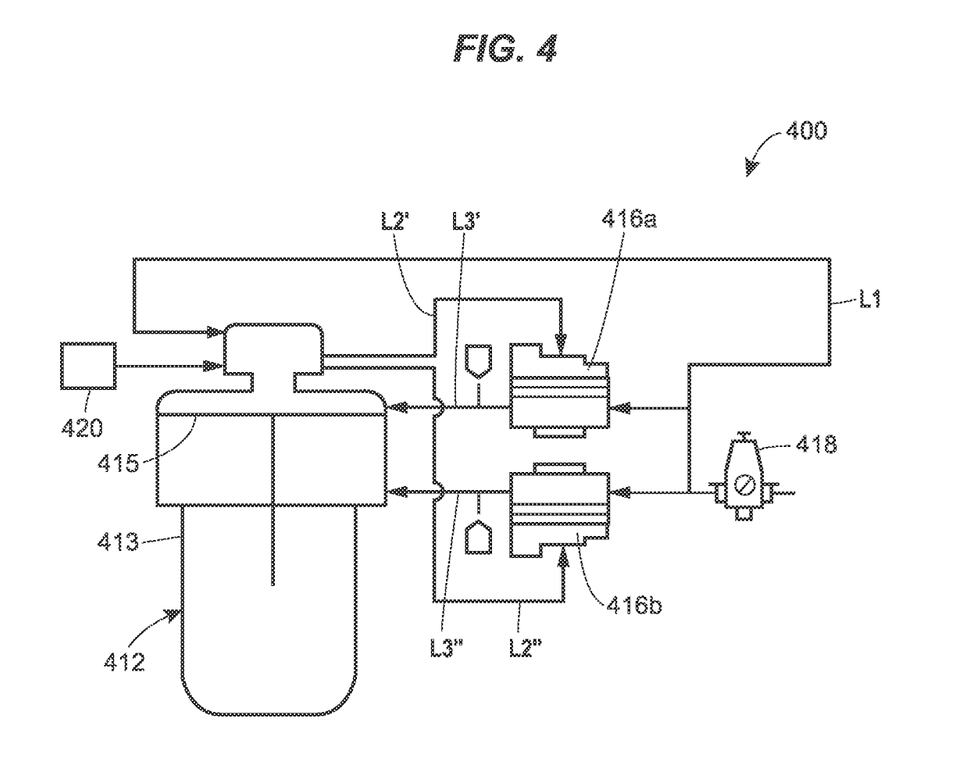
FIG. 4 is a schematic representation of a double-acting piston actuator assembly including two volume boosters constructed in accordance with the present disclosure.

While the volume boosters 16, 216 have thus far been described as being used in the single-acting diaphragm actuator assembly 10 depicted in FIG. 1, the volume boosters 16, 216 can also be adapted for use in a double-acting piston actuator assembly 400, as shown in FIG. 4.

The double-acting piston actuator assembly 400 comprises a piston-based actuator 412, a positioner 414, first and second volume boosters 416a, 416b, a regulator 418, and a controller 420. The various components are connected together via a plurality of fluid lines. For example, the regulator 418 provides a pressurized supply to the positioner 414 and the volume boosters 416a, 416b via a supply line L1. Based on an electrical signal received from the controller 420, the positioner 414 delivers a pneumatic signal to each of the volume boosters 416a, 416b via first and second output signal lines L2', L2". Finally, the volume boosters 416a, 416b deliver control pressure to the actuator 412 via two control lines L3', L3".

The actuator 412 includes a casing 413 containing a piston 415. The piston 415 is movable within the casing 413 based on the pressures received from the volume boosters 416a, 416b. For example, when the first volume booster 416a introduces a pressure into the casing 413 that is larger than a pressure introduced by the second volume booster 416b, the piston 415 moves downward. As the piston moves downward, fluid stored in the casing 413 below the piston 415 exhausts through the second volume booster 416b. When the fluid exhausts through the volume booster 416b, fluid flows along the "exhaust path" described above with reference to the volume booster 16 depicted in FIG. 2. The exhausting process is the same whether the volume booster 16 depicted in FIG. 2 or the second volume booster 116 depicted in FIG. 3 is used for the second volume booster 416b.

Similarly, when the second volume booster 416b introduces a pressure into the casing 413 that is larger than a pressure introduced by the first volume booster 416a, the piston 415 moves upward. Therefore, as the piston moves upward, fluid stored in the casing 413 above the piston 415 exhausts through the first volume booster 416a. Fluid exhausts through the first volume booster 416a in a manner identical to how it exhausts through the second volume booster 416b. Again, the exhausting process is the same whether the volume booster 16 depicted in FIG. 2 or the volume booster 116 depicted in FIG. 3 is used for the first volume booster 416a.

Such a double-acting actuator assembly 400 operates optimally when the supply capacity of the volume boosters 416a, 416b is slightly greater than the exhaust capacities, which also means that the exhaust resistances are slightly greater than the supply resistances. This is because the casing 413 of the actuator 412 is preferably maintained under a constant positive pressure, which keeps the piston 415 "stiff." A "stiff" piston 415 optimizes the stability of the actuator 12 by protecting the piston 415 against influence from external factors such as feedback from the corresponding control valve. When the supply and exhaust capacities are set too close to each other, the pressure within the casing of the actuator 412 will slightly decay upon each stroke of the piston 415. The reduced exhaust capacity therefore counteracts this decay.

Thus, in the case where each of the volume boosters 416a, 416b include the volume booster 16 depicted in FIG. 2, specific supply and exhaust trim components 74, 76 having specifically sized supply and exhaust passages 86, 96 can be selected such that the exhaust capacities are smaller than the supply capacities. The same selection process can be performed if each of the volume boosters 416a, 416b include the volume booster 116 depicted in FIG. 3.

Thus, it should further be appreciated that the volume boosters 16, 116 described herein advantageously enable the same volume booster, whether it be the volume booster 16 depicted in FIG. 2 or the volume booster 116 depicted in FIG. 3, to be used in single-acting actuator assemblies 10 (FIG. 1) or double-acting actuator assemblies 400 (FIG. 5) without sacrificing performance. The adjustment between the various applications is easily made by changing one or both of the supply and exhaust trim components to meet the desired performance characteristics. For example, as discussed above, the volume boosters 16, 116 described herein can be equipped for optimal performance the single-acting actuator assembly 10 of FIG. 1 by selecting supply and exhaust trim components 74, 76 having generally identical supply and exhaust capacities and fluid flow restrictions. To retrofit a volume booster 16, 116 that is being used in the single-acting actuator assembly 10 to be used in the double-acting actuator assembly 400 depicted in FIG. 4, the exhaust trim component 76, 276 merely has to be removed and replaced with a different exhaust trim component 76, 276 having an exhaust capacity that is lower than the supply capacity of the supply trim component 74. Alternatively, the supply trim component 74, 274 could be replaced with a different supply trim component 74, 274 having a supply capacity greater than the exhaust capacity of the exhaust trim component 76, 276.

Accordingly, it can be said that at least the supply and exhaust trim components 74, 274, 76, 276 of a volume booster 16, 116 used for a given application include trim components that are removably attached to the body and defining supply and exhaust passages having supply and exhaust fluid flow resistances, respectively, that can be pre-selected from a plurality of distinct supply and exhaust fluid flow resistances. Such a pre-selected fluid flow resistances customizes the volume booster for the desired specific application.

Because the fluid flow resistances of the trim components are at least partly dependent on the geometry and/or dimensions of the passages in the trim components, it can also be said that the supply and exhaust trim components 74, 274, 76, 276 of a selected volume booster 16, 116 for a given application include supply passages 86, 286 and exhaust passages 96, 296, where each set of passages has a selected set of dimensional parameters, the selected set of dimensional parameters pre-selected from a plurality of sets of distinct dimensional parameters. For example, these dimensional parameters can include, but are not limited to, the diameters $D_s$, $D_e$ and longitudinal dimensions $L_s$, $L_e$ of the supply and exhaust passages 74, 274, 76, 276.

Finally, in accordance with the foregoing, a technician can advantageously customize the boosters 16, 116 described herein for any given application by determining the desired exhaust and supply capacities for the application. Then, the technician can select a supply trim component 74, 274 and an exhaust trim component 76, 276 based on the desired capacities. With the appropriate components selected, the technician can removably install the components into the volume booster.

Therefore, the supply and exhaust capacities of the volume boosters 16, 116 can advantageously be independently varied depending on the desired flow characteristics of a specific application be simply changing the trim components. This is a cost-effective alternative to conventional designs where the entire volume booster must be replaced to change the supply and/or exhaust capacity.

In light of the foregoing, it should be appreciated that the volume boosters 16, 116 described herein are merely examples of fluid control devices incorporating the principles of the present disclosure. Other fluid control devices may also benefit from the structures and/or advantages of the present disclosure without departing from the spirit and scope of the following aspects and/or attached claims.

Aspect 1: A fluid flow control device, comprising: a body comprising an inlet port, a common port, and a discharge port; a supply path extending between the inlet port and the common port; an exhaust path extending between the common port and the discharge port; a supply port disposed within the body along the supply path between the inlet port and the common port; a control element disposed within the body and adapted for displacement between a closed position in sealing engagement with the supply port to close the supply path, and an open position spaced from the supply port to open the supply path; a diaphragm assembly defining an exhaust port and disposed along the exhaust path between the common port and the discharge port, the diaphragm assembly adapted for displacement between a closed position, wherein the exhaust port is in sealing engagement with the control element to close the exhaust path, and an open position, wherein the exhaust port is spaced from the control element to open the exhaust path; and an exhaust trim component disposed within the body and defining an exhaust passage along the exhaust flow path between the common port of the body and the exhaust port of the diaphragm assembly, the exhaust passage having a first exhaust fluid flow resistance, the exhaust trim component removably attached to the body thereby enabling the exhaust trim component to be removed and substituted with another exhaust trim component having an exhaust passage with a second exhaust fluid flow resistance that is different than the first exhaust fluid flow resistance.

Aspect 2: The device of aspect 1, wherein the exhaust trim component comprises an exhaust bushing threaded into the body and the exhaust passage comprises at least one bore extending through the exhaust bushing.

Aspect 3: The device of any one of the preceding aspects, wherein the exhaust trim component is selected from a plurality of exhaust trim components, each of the plurality of exhaust trim components defining a distinct exhaust passage having a distinct exhaust fluid flow resistance.

Aspect 4: The device of any one of the preceding aspects, wherein each exhaust passage of the plurality of exhaust trim components comprises at least one bore.

Aspect 5: The device of any one of the preceding aspects, wherein each first exhaust passage of the plurality of exhaust trim components comprises at least one of a distinct cross-sectional dimension and a distinct longitudinal dimension.

Aspect 6: The device of any one of the preceding aspects, further comprising a supply trim component removably attached to the body and defining a supply passage disposed along the supply path between the inlet port and the supply port.

Aspect 7: The device of any one of the preceding aspects, wherein the supply trim component is selected from a plurality of supply trim components, each of the plurality of supply trim components defining a distinct supply passage having a distinct supply fluid flow resistance.

Aspect 8: The device of any one of the preceding aspects, wherein each supply passage of the plurality of supply trim components comprises at least one bore.

Aspect 9: The device of any one of the preceding aspects, wherein each supply passage of the plurality of exhaust trim components comprises at least one of a distinct cross-sectional dimension and a distinct longitudinal dimension.

Aspect 10: A fluid flow control device, comprising: a body comprising an inlet port, a common port, and a discharge port; a supply path extending between the inlet port and the common port; an exhaust path extending between the common port and the discharge port a supply port disposed within the body along the supply path between the inlet port and the common port an exhaust port disposed within the body along the exhaust path between the common port and the discharge port a control element disposed within the body and adapted for displacement between a closed position in sealing engagement with the supply port to close the supply path, and an open position spaced from the supply port to open the supply path; and an exhaust trim component removably attached to the body and defining an exhaust passage disposed along the exhaust path between the common port and the exhaust port, the exhaust passage having a first exhaust fluid flow resistance, the first exhaust fluid flow resistance pre-selected from a plurality of distinct exhaust fluid flow resistances thereby customizing an exhaust capacity of the fluid flow control device for a specific application.

Aspect 11: The device of aspect 10, wherein the first exhaust fluid flow resistance of the exhaust passage is a function of at least one of a cross-sectional dimension of the exhaust passage in the exhaust trim component and a longitudinal dimension of the exhaust passage trim component.

Aspect 12: The device of any one of aspects 10 to 11, wherein the exhaust trim component comprises an exhaust bushing threaded into the body and the exhaust passage comprises at least one cylindrical bore extending through the exhaust bushing.

Aspect 13: The device of any one of aspects 10 to 12, further comprising a supply trim component removably attached to the body and defining a supply passage disposed along the supply path between the inlet port and the supply port, the supply passage having a second fluid flow resistance, the second fluid flow resistance pre-selected from a plurality of distinct supply fluid flow resistances to customize the fluid flow control device for a specific application.

Aspect 14: The device of any one of aspects 10 to 13, wherein the second fluid flow resistance of the supply passage is a function of at least one of a cross-sectional dimension of the supply passage in the supply trim component and a longitudinal dimension of the supply passage in the supply trim component.

Aspect 15: The device of any one of aspects 10 to 14, wherein the supply trim component comprises a supply bushing threaded to the body and the supply passage comprises at least one cylindrical bore extending through the supply bushing.

Aspect 16: The device of any one of aspects 10 to 15, further comprising a diaphragm assembly defining the exhaust port and being disposed along the exhaust path between the exhaust passage of the exhaust trim component and the discharge port of the body, the diaphragm assembly adapted for displacement between a closed position wherein the exhaust port is in sealing engagement with the control element to close the exhaust path, and an open position wherein the exhaust port is spaced from the control element to open the exhaust path.

Aspect 17: A fluid flow control device, comprising: a body comprising an inlet port, a common port, and a discharge port; a supply path extending between the inlet port and the common port; an exhaust path extending between the common port and the discharge port a supply port disposed within the body along the supply path between the inlet port and the common port an exhaust port disposed within the body along the exhaust path between the common port and the discharge port a control element disposed within the body and adapted for displacement between a closed position in sealing engagement with the supply port to close the supply path, and an open position spaced from the supply port to open the supply path an exhaust trim component removably attached to the body and defining an exhaust passage along the exhaust path between the common port and the exhaust port; an a first selected set of dimensional parameters for the exhaust passage, the first selected set of dimensional parameters pre-selected from a first plurality of sets of distinct dimensional parameters, thereby customizing an exhaust capacity of the fluid flow control device for a specific application.

Aspect 18: The device of aspect 17, wherein each set of the first plurality of sets of dimensional parameters includes at least one of a distinct cross-sectional dimension of the exhaust passage and a distinct longitudinal dimension of the exhaust passage.

Aspect 19: The device of any one of aspects 17 to 18, wherein each set of the first plurality of sets of dimensional parameters defines at least one of a distinct exhaust fluid flow resistance for the exhaust passage and a distinct exhaust capacity for the exhaust passage.

Aspect 20: The device of any one of aspects 17 to 19, wherein the exhaust trim component comprises an exhaust bushing threaded into the body and the exhaust passage comprises at least one cylindrical bore extending through the exhaust bushing.

Aspect 21: The device of any one of aspects 17 to 20, further comprising a supply trim component removably attached to the body and defining a supply passage along the supply path between the inlet port and the supply port; and a second selected set of dimensional parameters for the supply passage, the second selected set of dimensional parameters pre-selected from a second plurality of sets of distinct dimensional parameters, thereby customizing a supply capacity of the fluid flow control device for a specific application.

Aspect 22: The device of any one of aspects 17 to 21, wherein each set of the second plurality of sets of dimensional parameters defines at least one of a distinct supply fluid flow resistance for the supply passage and a distinct capacity for the supply passage.

Aspect 23: The device of any one of aspects 17 to 22, wherein the supply trim component comprises a supply bushing threaded to the body and the supply passage comprises at least one cylindrical bore extending through the supply bushing.

Aspect 24: The device of any one of aspects 17 to 23, further comprising a diaphragm assembly defining the exhaust port and being disposed along the exhaust path between the exhaust passage of the exhaust trim component and the discharge port of the body, the diaphragm assembly adapted for displacement between a closed position wherein the exhaust port is in sealing engagement with the control element to close the exhaust path, and an open position wherein the exhaust port is spaced from the control element to open the exhaust path.

Aspect 25: A fluid flow control device, comprising: a body comprising an inlet port, a common port, and a discharge port; a supply path extending between the inlet port and the common port; an exhaust path extending between the common port and the discharge port; a supply port disposed within the body along the supply path between the inlet port and the common port; an exhaust port disposed within the body along the exhaust path between the common port and the discharge port; a control element disposed within the body and adapted for displacement between a closed position in sealing engagement with the supply port to close the supply path, and an open position spaced from the supply port the open the supply path; and an exhaust trim component removably attached to the body and defining an exhaust passage disposed along the exhaust path between the common port and the exhaust port, the exhaust trim component selected from a first exhaust trim component and a second exhaust trim component, the first exhaust trim component defining a first exhaust passage having a first exhaust fluid flow resistance, the second exhaust trim component defining a second exhaust passage having a second exhaust fluid flow resistance that is different than the first exhaust fluid flow resistance.

Aspect 26: The device of aspect 25, wherein the first exhaust passage comprises at least one bore through the first exhaust trim component and the second exhaust passage comprises at least one bore though the second exhaust trim component.

Aspect 27: The device of any one of aspects 25 to 26, wherein the first exhaust passage comprises a first cross-sectional dimension and the second exhaust passage comprises a second cross-sectional dimension that is different than the first cross-sectional dimension.

Aspect 28: The device of any one of aspects 25 to 27, wherein the first exhaust passage comprises a first longitudinal dimension and the second exhaust passage comprises a second longitudinal dimension that is different than the first longitudinal dimension.

Aspect 29: The device of any one of aspects 25 to 28, wherein the first and second exhaust trim components each comprise an exhaust bushing adapted to be threaded into the body of the fluid flow control device.

Aspect 30: The device of any one of aspects 25 to 29, further comprising a supply trim component removably attached to the body and defining a supply passage disposed along the supply flow path between the inlet port and the supply port.

Aspect 31: The device of any one of aspects 25 to 30, wherein the supply trim component is selected from a first supply trim component and a second supply trim component, the first supply trim component defining a first supply passage having a first supply fluid flow resistance, the second supply trim component defining a second supply passage having a second supply fluid flow resistance that is different than the first supply fluid flow resistance.

Aspect 32: The device of any one of aspects 25 to 31, wherein the first supply passage comprises at least one bore through the first supply trim component and the second supply passage comprises at least one bore though the second supply trim component.

Aspect 33: The device of any one of aspects 25 to 32, wherein the first supply passage comprises a third cross-sectional dimension and the second supply passage comprises a fourth cross-sectional dimension that is different than the third cross-sectional dimension.

Aspect 34: The device of any one of aspects 25 to 33, wherein the first supply passage comprises a third longitudinal dimension and the second supply passage comprises a fourth longitudinal dimension that is different than the third longitudinal dimension.

Aspect 35: The device of any one of aspects 25 to 34, wherein the first and second supply trim components each comprise a supply bushing adapted to be threaded into the body of the fluid flow control device.

Aspect 36: The device of any one of aspects 25 to 35, further comprising a diaphragm assembly defining the exhaust port and being disposed along the exhaust path between the exhaust passage of the exhaust trim component and the discharge port of the body, the diaphragm assembly adapted for displacement between a closed position wherein the exhaust port is in sealing engagement with the control element, thereby closing the exhaust path, and an open position wherein the exhaust port is spaced from the control element, thereby opening the exhaust path.

Aspect 37: A method of configuring a fluid flow control device comprising a volume booster for a specific application, the volume booster comprising a body defining a supply path and an exhaust path, the supply path extending from an inlet port, through a supply port, and to a common port, the exhaust path extending from the common port, through an exhaust port, and to a discharge port, the method comprising: determining a desired supply capacity for the supply path; selecting a supply trim component from a plurality of supply trim components based on the desired supply capacity for the supply flow path, each of the plurality of supply trim components defining a supply passage with a distinct supply fluid flow resistance; determining a desired exhaust capacity for the exhaust path; selecting an exhaust trim component from a plurality of exhaust trim components based on the desired exhaust capacity for the exhaust path, each of the plurality of exhaust trim components defining an exhaust passages with a distinct exhaust fluid flow resistance; removably installing the selected exhaust trim component into the body of the volume booster at a location along the exhaust path between the common port and the exhaust port; and removably installing the selected supply trim component into the body of the volume booster at a location along the supply path between the inlet port and the supply port.

Aspect 38: The method of aspect 37, wherein selecting the supply trim component comprises selecting a supply trim component having a passage that comprises at least one bore of a specific cross-sectional dimension to accommodate the desired supply capacity.

Aspect 39: The method of any one of aspects 37 to 38, wherein selecting the supply trim component comprises selecting a supply trim component having a passage that comprises at least one bore of a specific longitudinal dimension to accommodate the desired supply capacity.

Aspect 40: The method of any one of aspects 37 to 39, wherein selecting the exhaust trim component comprises selecting an exhaust trim component having a passage comprising at least one bore of a specific cross-sectional dimension to accommodate the desired exhaust capacity.

Aspect 41: The method of any one of aspects 37 to 40, wherein selecting the exhaust trim component comprises selecting a exhaust trim component having a passage that comprises at least one bore of a specific longitudinal dimension to accommodate the desired exhaust capacity.

What is claimed:

1. A fluid flow control device, comprising:
   a body comprising an inlet port, a common port, and a discharge port;
   a supply path extending between the inlet port and the common port;
   an exhaust path extending between the common port and the discharge port;
   a supply port disposed within the body along the supply path between the inlet port and the common port;
   a control element disposed within the body and comprising a supply plug, an exhaust plug, and a stem connecting the supply plug and the exhaust plug, the control element adapted for displacement between a closed position whereby the supply plug is in sealing engagement with the supply port to close the supply path, and an open position whereby the supply plug is spaced from the supply port to open the supply path;
   a diaphragm assembly defining an exhaust port and disposed along the exhaust path between the common port and the discharge port, the diaphragm assembly comprising at least one diaphragm adapted for displacement between a first position, wherein the exhaust port is in sealing engagement with the control element to close the exhaust path, and a second position, wherein the exhaust port is spaced from the exhaust plug of the control element to open the exhaust path;
   a supply trim component removably attached to the body and defining a supply passage disposed along the supply path between the inlet port and the supply port; and
   an exhaust trim component disposed within the body and defining a control opening and an exhaust passage, the control opening configured to receive a portion of the control element, and the exhaust passage extending axially through the exhaust trim component and along the exhaust flow path between the common port of the body and the exhaust port of the diaphragm assembly, the exhaust passage having a first exhaust fluid flow resistance,
   the exhaust trim component removably attached to the body thereby enabling the exhaust trim component to be removed and substituted with another exhaust trim component having an exhaust passage with a second exhaust fluid flow resistance that is different than the first exhaust fluid flow resistance.

2. The device of claim 1, wherein the exhaust trim component comprises an exhaust bushing threaded into the body and the exhaust passage comprises at least one bore extending axially through the exhaust bushing.

3. The device of claim 1, wherein the exhaust trim component is selected from a plurality of exhaust trim components, each of the plurality of exhaust trim components defining a distinct exhaust passage having a distinct exhaust fluid flow resistance.

4. The device of claim 3, wherein each exhaust passage of the plurality of exhaust trim components comprises at least one bore.

5. The device of claim 3, wherein each first exhaust passage of the plurality of exhaust trim components comprises at least one of a distinct cross-sectional dimension and a distinct longitudinal dimension.

6. The device of claim 1, wherein the exhaust trim component defines a plurality of exhaust passages, the plurality of exhaust passages including the exhaust passage and at least one additional exhaust passage, each of the plurality of exhaust passages comprising a cylindrical bore extending axially through the exhaust trim component.

7. The device of claim 1, wherein the supply trim component is selected from a plurality of supply trim components, each of the plurality of supply trim components defining a distinct supply passage having a distinct supply fluid flow resistance.

8. The device of claim 7, wherein each supply passage of the plurality of supply trim components comprises at least one bore.

9. The device of claim 7, wherein each supply passage of the plurality of exhaust trim components comprises at least one of a distinct cross-sectional dimension and a distinct longitudinal dimension.

10. A fluid flow control device, comprising:
    a body comprising an inlet port, a common port, and a discharge port;
    a supply path extending between the inlet port and the common port;
    an exhaust path extending between the common port and the discharge port;
    a supply port disposed within the body along the supply path between the inlet port and the common port;
    an exhaust port disposed within the body along the exhaust path between the common port and the discharge port;
    a control element disposed within the body and comprising a plug adapted for displacement between a closed position in sealing engagement with the supply port to close the supply path, and an open position spaced from the supply port to open the supply path;
    an exhaust trim component removably attached to the body and defining a control opening and an exhaust passage, the exhaust passage extending axially through the exhaust trim component and disposed along the exhaust path between the common port and the exhaust port, the exhaust passage having a first exhaust fluid flow resistance, the first exhaust fluid flow resistance pre-selected from a plurality of distinct exhaust fluid flow resistances thereby customizing an exhaust capacity of the fluid flow control device for a specific application; and
    a supply trim component removably attached to the body and defining a supply passage disposed along the supply path between the inlet port and the supply ort the supply passage having a second fluid flow resistance, the second fluid flow resistance pre-selected from a plurality of distinct supply fluid flow resistances to customize the fluid flow control device for a specific application.

11. The device of claim 10, wherein the first exhaust fluid flow resistance of the exhaust passage is a function of at least one of a cross-sectional dimension of the exhaust passage in the exhaust trim component and a longitudinal dimension of the exhaust passage trim component.

12. The device of claim 10, wherein the exhaust trim component comprises an exhaust bushing threaded into the body and the exhaust passage comprises at least one cylindrical bore extending axially through the exhaust bushing.

13. The device of claim 10, wherein the second fluid flow resistance of the supply passage is a function of at least one of a cross-sectional dimension of the supply passage in the supply trim component and a longitudinal dimension of the supply passage in the supply trim component.

14. The device of claim 10, wherein the supply trim component comprises a supply bushing threaded to the body and the supply passage comprises at least one cylindrical bore extending through the supply bushing.

15. The device of claim 10, further comprising a diaphragm assembly defining the exhaust port and being disposed along the exhaust path between the exhaust passage of the exhaust trim component and the discharge port of the body, the diaphragm assembly comprising at least one diaphragm adapted for displacement between a first position wherein the exhaust port is in sealing engagement with the control element to close the exhaust path, and a second position wherein the exhaust port is spaced from the control element to open the exhaust path.

16. A fluid flow control device, comprising:
a body comprising an inlet port, a common port, and a discharge port;
a supply path extending between the inlet port and the common port;
an exhaust path extending between the common port and the discharge port;
a supply port disposed within the body along the supply path between the inlet port and the common port;
an exhaust port disposed within the body along the exhaust path between the common port and the discharge port;
a control element disposed within the body and comprising a plug adapted for displacement between a closed position in sealing engagement with the supply port to close the supply path, and an open position spaced from the supply port to open the supply path;
an exhaust trim component removably attached to the body and defining a control opening and an exhaust passage, the control opening configured to receive a portion of the control element, and the exhaust passage extending axially through the exhaust trim component and along the exhaust path between the common port and the exhaust port;
a first selected set of dimensional parameters for the exhaust passage, the first selected set of dimensional parameters pre-selected from a first plurality of sets of distinct dimensional parameters, thereby customizing an exhaust capacity of the fluid flow control device for a specific application;
a supply trim component removably attached to the body and defining a supply passage along the supply path between the inlet port and the supply port; and
a second selected set of dimensional parameters for the supply passage, the second selected set of dimensional parameters pre-selected from a second plurality of sets of distinct dimensional parameters, thereby customizing a supply capacity of the fluid flow control device for a specific application.

17. The device of claim 16, wherein each set of the first plurality of sets of dimensional parameters includes at least one of a distinct cross-sectional dimension of the exhaust passage and a distinct longitudinal dimension of the exhaust passage.

18. The device of claim 16, wherein each set of the first plurality of sets of dimensional parameters defines at least one of a distinct exhaust fluid flow resistance for the exhaust passage and a distinct exhaust capacity for the exhaust passage.

19. The device of claim 16, wherein the exhaust trim component comprises an exhaust bushing threaded into the body and the exhaust passage comprises at least one cylindrical bore extending axially through the exhaust bushing.

20. The device of claim 16, wherein each set of the second plurality of sets of dimensional parameters defines at least one of a distinct supply fluid flow resistance for the supply passage and a distinct capacity for the supply passage.

21. The device of claim 16, wherein the supply trim component comprises a supply bushing threaded to the body and the supply passage comprises at least one cylindrical bore extending through the supply bushing.

22. The device of claim 16, further comprising a diaphragm assembly defining the exhaust port and being disposed along the exhaust path between the exhaust passage of the exhaust trim component and the discharge port of the body, the diaphragm assembly comprising at least one diaphragm adapted for displacement between a first position wherein the exhaust port is in sealing engagement with the control element to close the exhaust path, and a second position wherein the exhaust port is spaced from the control element to open the exhaust path.

23. A fluid flow control device, comprising:
a body comprising an inlet port, a common port, and a discharge port;
a supply path extending between the inlet port and the common port;
an exhaust path extending between the common port and the discharge port;
a supply port disposed within the body along the supply path between the inlet port and the common port;
an exhaust port disposed within the body along the exhaust path between the common port and the discharge port;
a control element disposed within the body and comprising a plug adapted for displacement between a closed position in sealing engagement with the supply port to close the supply path, and an open position spaced from the supply port the open the supply path;
an exhaust trim component removably attached to the body and defining a control opening and an exhaust passage, the control opening configured to receive a portion of the control element, and the exhaust passage extending axially through the exhaust trim component and disposed along the exhaust path between the common port and the exhaust port, the exhaust trim component selected from a first exhaust trim component and a second exhaust trim component, the first exhaust trim component defining a first exhaust passage having a first exhaust fluid flow resistance, the second exhaust trim component defining a second exhaust passage having a second exhaust fluid flow resistance that is different than the first exhaust fluid flow resistance; and
a supply trim component removably attached to the body and defining a supply passage disposed along the supply flow path between the inlet port and the supply port.

24. The device of claim 23, wherein the first exhaust passage comprises at least one bore extending axially through the first exhaust trim component and the second exhaust passage comprises at least one bore extending axially though the second exhaust trim component.

25. The device of claim 23, wherein the first exhaust passage comprises a first cross-sectional dimension and the second exhaust passage comprises a second cross-sectional dimension that is different than the first cross-sectional dimension.

26. The device of claim 23, wherein the first exhaust passage comprises a first longitudinal dimension and the second exhaust passage comprises a second longitudinal dimension that is different than the first longitudinal dimension.

27. The device of claim 23, wherein the first and second exhaust trim components each comprise an exhaust bushing adapted to be threaded into the body of the fluid flow control device.

28. The device of claim 23, wherein the supply trim component is selected from a first supply trim component and a second supply trim component, the first supply trim component defining a first supply passage having a first supply fluid flow resistance, the second supply trim component defining a second supply passage having a second supply fluid flow resistance that is different than the first supply fluid flow resistance.

29. The device of claim 28, wherein the first supply passage comprises at least one bore through the first supply trim component and the second supply passage comprises at least one bore though the second supply trim component.

30. The device of claim 28, wherein the first supply passage comprises a third cross-sectional dimension and the second supply passage comprises a fourth cross-sectional dimension that is different than the third cross-sectional dimension.

31. The device of claim 28, wherein the first supply passage comprises a third longitudinal dimension and the second supply passage comprises a fourth longitudinal dimension that is different than the third longitudinal dimension.

32. The device of claim 28, wherein the first and second supply trim components each comprise a supply bushing adapted to be threaded into the body of the fluid flow control device.

33. The device of claim 23, further comprising a diaphragm assembly defining the exhaust port and being disposed along the exhaust path between the exhaust passage of the exhaust trim component and the discharge port of the body, the diaphragm assembly comprising at least one diaphragm adapted for displacement between a first position wherein the exhaust port is in sealing engagement with the control element, thereby closing the exhaust path, and a second position wherein the exhaust port is spaced from the control element, thereby opening the exhaust path.

34. A method of configuring a fluid flow control device comprising a volume booster for a specific application, the volume booster comprising a body, a supply path, an exhaust path, a supply port, an exhaust port, and a control element, the body including an inlet port, a common port, and a discharge port, the supply path extending from an inlet port, through the supply port, and to the common port, the exhaust path extending from the common port, through the exhaust port, and to the discharge port, the supply port disposed within the body along the supply path between the inlet port and the common port, the exhaust port disposed within the body along the exhaust path between the common port and the discharge port, and the control element disposed within the body and comprising a plug adapted for displacement between a closed position in sealing engagement with the supply port to close the supply path, and an open position spaced from the supply port to open the supply path, the method comprising:
    determining a desired supply capacity for the supply path;
    selecting a supply trim component from a plurality of supply trim components based on the desired supply capacity for the supply flow path, each of the plurality of supply trim components defining a supply passage with a distinct supply fluid flow resistance, such that a supply capacity of the volume booster can be customized for the specific application;
    determining a desired exhaust capacity for the exhaust path;
    selecting an exhaust trim component from a plurality of exhaust trim components based on the desired exhaust capacity for the exhaust path, each of the plurality of exhaust trim components defining a control opening and an exhaust passage that extends axially through the exhaust trim component and has a distinct exhaust fluid flow resistance, such that an exhaust capacity of the volume booster can be customized for the specific application;
    removably installing the selected exhaust trim component into the body of the volume booster at a location along the exhaust path between the common port and the exhaust port; and
    removably installing the selected supply trim component into the body of the volume booster at a location along the supply path between the inlet port and the supply port.

35. The method of claim 34, wherein selecting the supply trim component comprises selecting a supply trim component having a passage that comprises at least one bore of a specific cross-sectional dimension to accommodate the desired supply capacity.

36. The method of claim 34, wherein selecting the supply trim component comprises selecting a supply trim component having a passage that comprises at least one bore of a specific longitudinal dimension to accommodate the desired supply capacity.

37. The method of claim 34, wherein selecting the exhaust trim component comprises selecting an exhaust trim component having a passage comprising at least one bore of a specific cross-sectional dimension to accommodate the desired exhaust capacity.

38. The method of claim 34, wherein selecting the exhaust trim component comprises selecting an exhaust trim component having a passage that comprises at least one bore of a specific longitudinal dimension to accommodate the desired exhaust capacity.

* * * * *

UNITED STATES PATENT AND TRADEMARK OFFICE
CERTIFICATE OF CORRECTION

PATENT NO. : 9,032,986 B2  
APPLICATION NO. : 13/209091  
DATED : May 19, 2015  
INVENTOR(S) : Michel K. Lovell et al.

Page 1 of 1

It is certified that error appears in the above-identified patent and that said Letters Patent is hereby corrected as shown below:

In the Specification:

At Column 8, line 23, "diameters," should be -- diameters --.

At Column 14, line 40, "an a" should be -- and a --.

At Column 17, line 16, "a exhaust" should be -- an exhaust --.

In the Claims:

Column 18, line 60, Claim 10, "ort" should be -- port, --.

Signed and Sealed this
Tenth Day of May, 2016

Michelle K. Lee
*Director of the United States Patent and Trademark Office*